(12) United States Patent
Hoover

(10) Patent No.: US 11,014,445 B2
(45) Date of Patent: May 25, 2021

(54) PRESSURIZED LIQUID FUEL TANK SYSTEM AND VEHICLE INCLUDING SAME

(71) Applicants: VOLVO TRUCK CORPORATION, Gothenburg (SE); Dale Hoover, McConnellsburg, PA (US)

(72) Inventor: Dale Hoover, McConnellsburg, PA (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 15/749,304

(22) PCT Filed: Aug. 11, 2015

(86) PCT No.: PCT/US2015/044550
§ 371 (c)(1),
(2) Date: Jan. 31, 2018

(87) PCT Pub. No.: WO2017/027010
PCT Pub. Date: Feb. 16, 2017

(65) Prior Publication Data
US 2018/0222315 A1    Aug. 9, 2018

(51) Int. Cl.
*B60K 15/077* (2006.01)
*B60K 15/03* (2006.01)
(Continued)

(52) U.S. Cl.
CPC .......... *B60K 15/077* (2013.01); *B60K 15/03* (2013.01); *B60K 15/035* (2013.01);
(Continued)

(58) Field of Classification Search
CPC .......... B60K 15/03; B60K 2015/03118; B60K 2015/03144; B60K 2015/03289;
(Continued)

(56) References Cited

U.S. PATENT DOCUMENTS

| 1,776,877 A | * | 9/1930 | Yonkese | B64D 37/20 |
| | | | | 244/135 C |
| 2,703,138 A | * | 3/1955 | Amon, Jr. | B64D 37/005 |
| | | | | 137/209 |

(Continued)

FOREIGN PATENT DOCUMENTS

| DE | 19714963 A1 | 10/1998 |
| JP | 2001115898 A | 4/2001 |

(Continued)

OTHER PUBLICATIONS

International Search Report (dated Nov. 2, 2015) for corresponding International App. PCT/US2015/044550.

*Primary Examiner* — Craig J Price
(74) *Attorney, Agent, or Firm* — WRB-IP LLP

(57) ABSTRACT

A pressurized liquid fuel tank system arranged to contain a first mass of liquid fuel such as Dimethyl-Ether (DME) is provided. The system includes a first tank having a first volume, a second tank having a second volume, a first conduit between a top of the first tank and a top of the second tank, and a second conduit between the first tank and a bottom of the second tank, wherein a sum of the first volume and the second volume is designed to equal a sum of a first mass volume of the first mass of liquid fuel plus an expansion volume equal to at least 5% of the first mass volume. A vehicle with such a fuel tank system is also disclosed.

26 Claims, 3 Drawing Sheets

(51) Int. Cl.
  *B60K 15/035* (2006.01)
  *B60K 15/067* (2006.01)
(52) U.S. Cl.
  CPC .. *B60K 15/067* (2013.01); *B60K 2015/03118* (2013.01); *B60K 2015/03138* (2013.01); *B60K 2015/03144* (2013.01)
(58) Field of Classification Search
  CPC .... B60K 2015/03217; B60K 15/03144; B60K 15/03289; B60K 15/03217; B60K 2015/03151; B60K 2015/03171; Y10T 137/86187–86381; Y10T 137/7303–7326; Y10T 137/7758–777; F02M 37/0047; F02M 37/0094; F02M 37/0076
  USPC .... 137/487.5, 551, 558, 571, 572, 574, 575, 137/578, 899.4; 114/74 R, 343; 123/510–521; 220/749, 750
  See application file for complete search history.

(56) References Cited

U.S. PATENT DOCUMENTS

| | | | | |
|---|---|---|---|---|
| 2,928,254 | A * | 3/1960 | Rae | F17C 3/10 62/48.2 |
| 3,314,445 | A * | 4/1967 | Brodt | G01F 23/161 137/396 |
| 3,379,336 | A * | 4/1968 | Stedfeld | H01M 8/02 220/586 |
| 3,416,547 | A * | 12/1968 | Glenn, Jr. | E21B 43/34 137/12 |
| 3,520,329 | A * | 7/1970 | Weber | B60K 15/03 137/571 |
| 3,610,220 | A * | 10/1971 | Yamada | B60K 15/03504 123/518 |
| 3,783,841 | A * | 1/1974 | Hirschler, Jr. | F02M 1/165 123/576 |
| 3,844,264 | A | 8/1974 | Grainger | |
| 3,854,911 | A * | 12/1974 | Walker | F02M 25/089 96/144 |
| 4,242,885 | A * | 1/1981 | Quack | F25J 1/0067 62/500 |
| 4,552,175 | A | 11/1985 | Schiemann | |
| 4,930,537 | A * | 6/1990 | Farmer | B60K 15/00 123/514 |
| 5,042,518 | A * | 8/1991 | Singhe | F04F 1/02 137/2 |
| 5,197,443 | A * | 3/1993 | Hodgkins | B60K 15/077 123/510 |
| 5,203,677 | A * | 4/1993 | Lix | G01N 9/10 137/565.3 |
| 5,357,908 | A * | 10/1994 | Sung | F02M 1/165 123/179.8 |
| 5,417,239 | A * | 5/1995 | Ford | B60K 15/00 137/571 |
| 5,531,240 | A * | 7/1996 | Kelada | B67D 7/32 137/15.16 |
| 5,799,604 | A * | 9/1998 | Long | B63B 3/28 114/356 |
| 5,983,932 | A | 11/1999 | Wagner et al. | |
| 6,000,426 | A * | 12/1999 | Tuckey | B60K 15/035 123/516 |
| 6,016,834 | A | 1/2000 | Leidl | |
| 6,604,539 | B1 | 8/2003 | Strohmayer et al. | |
| 6,792,966 | B2 * | 9/2004 | Harvey | F02M 37/0047 137/396 |
| 6,929,039 | B2 | 8/2005 | Vaitses | |
| 7,168,415 | B2 * | 1/2007 | Studebaker | F02D 33/003 123/509 |
| 7,617,848 | B2 * | 11/2009 | Matheoud | F17C 5/02 141/301 |
| 8,511,341 | B2 * | 8/2013 | Johnston | B60K 15/03 114/289 |
| 8,539,938 | B2 * | 9/2013 | Elwart | F02M 25/0809 123/575 |
| 8,579,332 | B2 * | 11/2013 | Sonderegger | B60K 15/03 280/834 |
| 8,622,101 | B2 * | 1/2014 | Smith | B63B 25/082 141/198 |
| 9,599,127 | B2 * | 3/2017 | Wiens | F15B 1/26 |
| 2001/0035215 | A1 * | 11/2001 | Tipton | B60K 15/00 137/571 |
| 2005/0193989 | A1 * | 9/2005 | Veenstra | B60K 15/03006 123/527 |

FOREIGN PATENT DOCUMENTS

| | | |
|---|---|---|
| JP | 200845463 A | 2/2008 |
| WO | 2010077187 A1 | 7/2010 |

\* cited by examiner

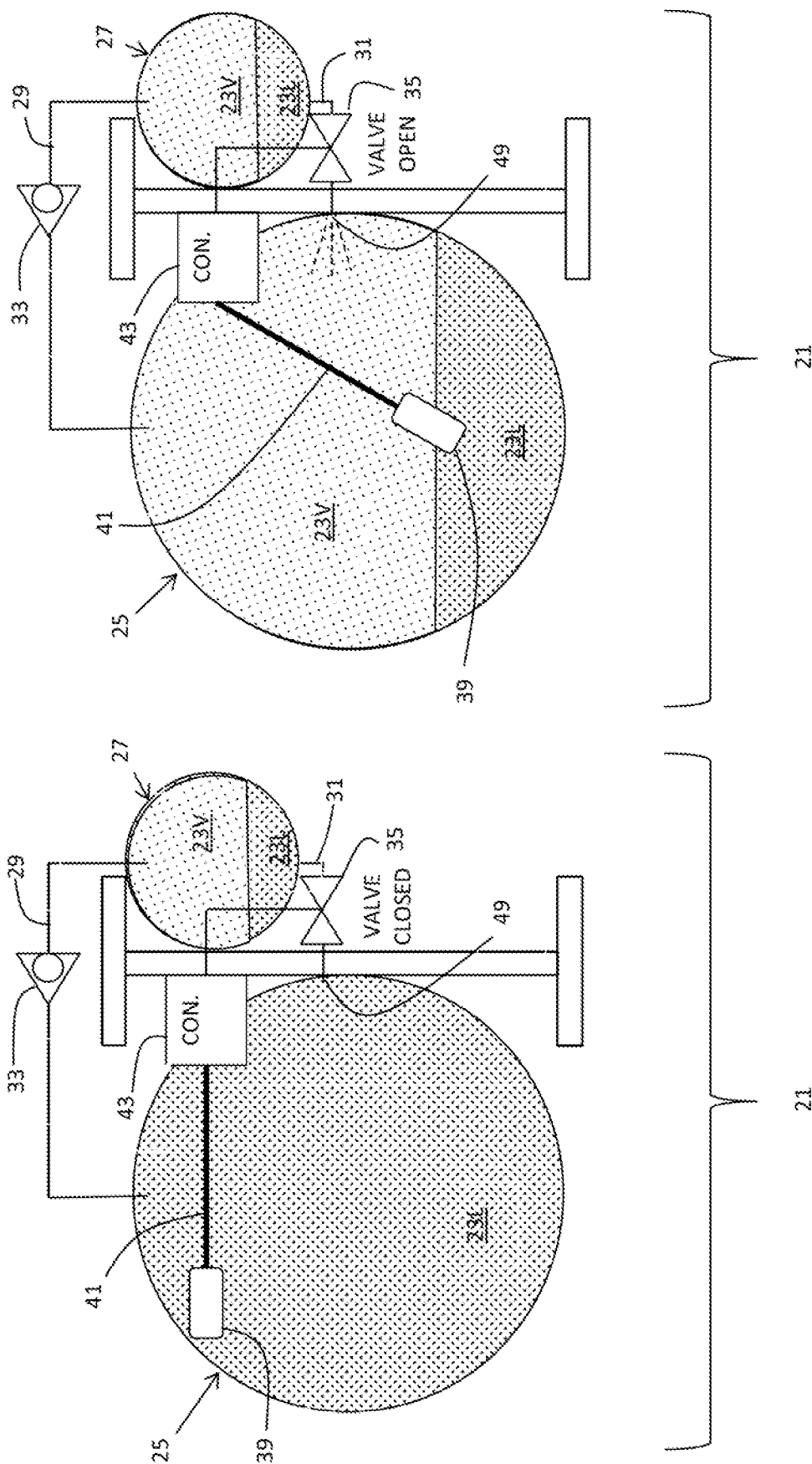

PRESSURIZED LIQUID FUEL TANK SYSTEM AND VEHICLE INCLUDING SAME

BACKGROUND AND SUMMARY

The present invention relates generally to pressurized liquid fuel tank systems and, more particularly, to such systems comprising pressurized fuel tanks requiring a vapor expansion volume.

Certain fuels, such as Propane and Dimethyl Ether (DME), are stored under pressure. Aspects of the present invention pertain to any fuel that is kept under pressure; however, the invention will be described primarily in connection with its application to DIME fuel systems. DME shows substantial promise as a fuel for use in diesel and other engines. Its advantages include that it is sulfur-free and combusts with minimal particulate emissions, making it particularly attractive for meeting increasingly stringent emissions regulations.

The use of DME as a fuel in compression ignition engines requires the use of a fuel tank capable of storing both liquid and gaseous DME. Liquid DME expands in volume as the fuel temperature increase, with an approximately 9% expansion in volume from 20° C. to 50° C. (68° F. to 122° F.). The final expansion volume required will be calculated following industry normal practices for the liquid contained in the pressure vessel. For example, recommendations from professional organizations are that propane tanks have a 20% expansion volume. For DME to follow the propane example, a 15% expansion volume would be required. Using historical data from the U.S. Weather Service, a maximum temperature increase seen in one day is 28° C. or 50° F. Going back to 1890, temperature increases of 28° C. or 50° F. in one day have only happened fewer than one hundred times out of over 45,000 days. Heating due to fuel returning to the fuel tank from the engine will also increase the fuel tank temperature and, thus, the internal fuel volume. The tank's fuel volume increase is offset by the fuel being used by the engine which lowers the quantity of fuel in the tank faster than the volume increases. The fuel tank temperature will only increase until an equilibrium point with the environment is attained. An external fuel cooler could be used to reduce the temperature of the fuel being returned to the tanks, if required.

The extra volume needs to be made available to prevent the bursting of the fuel tank due to hydrostatic pressure. This can be particularly important in fuel tanks that are filled, e.g., during a cool time of the day and then left to sit in a hot environment, or, for tanks used on vehicles, during an initial driving interval when heated fuel from the engine is returned to the fuel tank.

DME has a low vapor pressure saturation curve. It will remain a liquid under moderately low pressure at ambient temperature conditions. For example, it would be a liquid at 20° C. and 5 bars. Typically, as with tanks for other liquids under pressure, such as propane, the DME liquid is dispensed into the tank to a particular mass of contents from a larger source of the liquid that is typically at ambient temperatures and saturated vapor pressures. A DME fuel tank containing fuel at an elevated pressure would be considered a pressure vessel because the internal tank pressure will exceed ambient pressure and, as such, needs to be designed accordingly, following all safety rules and regulations to prevent the bursting of the tank or vessel. It is, therefore, desirable to provide a fuel tank system that is adapted for use with DME.

Pressure tanks or vessels designed today follow well established rules and guidelines to prevent bursting. The tank design involves selecting the proper material and thickness to meet the tensile strength required for the application, as well to provide necessary chemical resistance to the material being stored. In addition, pressure tanks incorporate a pressure relief valve that allows the excess pressure to be bled out of the container before the bursting pressure is reached, such as by dumping liquid on the ground or vapor into the atmosphere. The geometry of the tank design is also important, as curved surfaces are better than flat surfaces for evenly distributing stresses in the container. A 20% vapor head space is normally used for storage of propane in a pressure container, while a 15% vapor head space is typical for DME.

DME has an energy equivalent level of 1.88 gallons of DME to 1.0 gallon of diesel fuel. Larger tanks are therefore required to accommodate DME fuel than to accommodate diesel fuel containing the fuel providing equivalent energy. This is significant for fuel systems such as are used on vehicles such as trucks. For a truck that uses DME fuel, much larger tanks must be provided to go the same distance as a truck running on diesel fuel. Not only is it necessary to increase the volume of the equivalent diesel tank by a 1.88 multiplier, it is also necessary to allow for the expansion of the liquid fuel without exceeding the bursting pressure of the tank. Standard practice is to allow a 15% gas buffer zone above the liquid for expansion. For example, given a theoretical diesel fuel tank size of 100 gallons, for a tank containing an energy equivalent amount of DME, the volume is first multiplied by 1.88 so that at least a 188 gallon tank is required for the energy equivalent amount of DME. When a 15% expansion volume is added to this 188 gallons, a 216.2 gallon tank is required, i.e., 188+(0.15)*(188)=216.2 gallon.

The large increase in volume necessary to provide DME fuel tanks that store an equivalent amount of energy presents problems in terms of packaging such tanks on a conventional diesel powered truck that would ordinarily be provided with, e.g., a 100 gallon tank. It is therefore desirable to provide a means allowing for the fuller utilization of the tank's volume without exceeding the burst pressure of the vessel.

The inventor has recognized that, although the energy content of pure DME cannot change, there is a way to make a useful adjustment to a tank's buffer volume. The inventor recognized that conventional car or truck radiators involve issues similar to those confronted by persons seeking to design DME fuel systems: such radiators are also under pressure and completely filled, however, they use an overflow container to capture the coolant released through the pressure relief cap on the radiator. Once pressure in the radiator starts to drop, coolant in the overflow container is withdrawn back into the radiator and coolant system.

In an aspect of the present invention, the inventor proposes an analogous system including providing what might be considered to be an overflow container for DME. The overflow container can contain, e.g., a volume of compressed vapor. The overflow container can be a smaller vessel (e.g., 10% of the main fuel tank) and might be mounted on a different part of the frame than the main fuel tank, such as on an inside of the frame rail where the main fuel tank is mounted on an outside of the frame rail, and can be connected to the main fuel tank by a fuel line. For example, a liquid fuel line can go from the main fuel tank to the bottom of the overflow container. A vapor fuel line can go from the main fuel tank to the top of the overflow container. To illustrate, if the main fuel tank is designed to provide for a 5% vapor volume and the overflow container is designed to provide for a 10% vapor volume, a total of 15% expansion volume can be provided using a smaller main fuel tank than would otherwise be required to provide such an expansion volume. In addition, the length and volume of conduits between the overflow container and the main fuel tank can be included as part of the entire expansion volume. The use of multiple fuel vessels can facilitate installation of DME fuel tanks in the same or similar spaces on vehicles that were designed to carry diesel fuel tanks, and can facilitate the design of fuel tank systems that make optimal use of space, regardless whether they are intended to replace diesel fuel tanks. The ratios of sizes of the main fuel tank and overflow container can, of course, be adjusted based upon the design requirements. The design may also provide for both the main fuel tank and the overflow container to hold both liquid and vapor.

Persons skilled in the art will appreciate that the exact ratios of the main fuel tank compression volume and the overflow tank volume are design decisions and will be based upon factors including available vehicle packaging space. Using an auxiliary or overflow tank as additional compression volume for the fuel tank allows more flexibility in the design of the fuel tank size.

In accordance with an aspect of the present invention, a pressurized liquid fuel tank system is provide, the fuel tank system being arranged to contain a first mass of liquid fuel. The system comprises a first tank having a first volume, a second tank having a second volume, a first conduit between a top of the first tank and a top of the second tank, and a second conduit between the first tank and a bottom of the second tank, wherein a sum of the first volume and the second volume is designed to equal a sum of a first mass volume of the first mass of liquid fuel plus an expansion volume equal to at least 5% of the first mass volume.

In accordance with another aspect of the present invention, a vehicle comprising a pressurized liquid fuel tank system is provided, the fuel tank system being arranged to contain a first mass of liquid fuel. The vehicle comprises a vehicle frame and the pressurized liquid fuel tank system mounted on the frame. The pressurized liquid fuel tank system comprises a first tank having a first volume, a second tank having a second volume, a first conduit between a top of the first tank and a top of the second tank, and a second conduit between the first tank and a bottom of the second tank, wherein a sum of the first volume and the second volume is designed to equal a sum of a first mass volume of the first mass of liquid fuel plus an expansion volume equal to at least 5% of the first mass volume.

BRIEF DESCRIPTION OF THE DRAWINGS

The features and advantages of the present invention are well understood by reading the following detailed description in conjunction with the drawings in which like numerals indicate similar elements and in which:

FIGS. 1-4 are schematic views of a pressurized liquid fuel tank system according to aspects of the present invention, wherein fuel tanks are filled to different levels.

DETAILED DESCRIPTION

A pressurized liquid fuel tank system 21 according to an aspect of the present invention is shown in FIGS. 1-4. The fuel tank system 21 is arranged to contain a first mass of pressurized fuel 23L. For purposes of discussion, the pressurized liquid fuel tank system 21 and method according to the present invention will be described in connection with pressurized liquid Dimethyl Ether (DME), except where otherwise indicated, it being appreciated that the present invention is applicable to other types of pressurized liquid fuels.

The liquid DME 23L can expand in volume as temperature rises, and, DME vapor 23V will also typically occupy some volume of the fuel tank system, particularly as temperature of the liquid DME rises. The first mass volume of the first mass of liquid DME shall be considered to be equal to a volume or range of volumes of the first mass at typical temperatures and pressures at which DME is dispensed from conventional storage tanks or ranges of such temperatures and pressures. For purposes of the present discussion, it shall be assumed that the typical pressure is atmospheric pressure (at sea level) and the typical temperature is approximately 70° F. (21° C.), with ranges of pressure and temperature varying with climate in the particular geographical location, storage conditions, altitude, and other conditions that can affect the volume of DME. Today, many modern fuel dispensers include flow meters and temperature sensors for sensing the temperature of fuel being dispensed to make sure that the amount of fuel dispensed is corrected for the ambient temperature. Older systems relied on the weight of the fuel.

Figure 1:
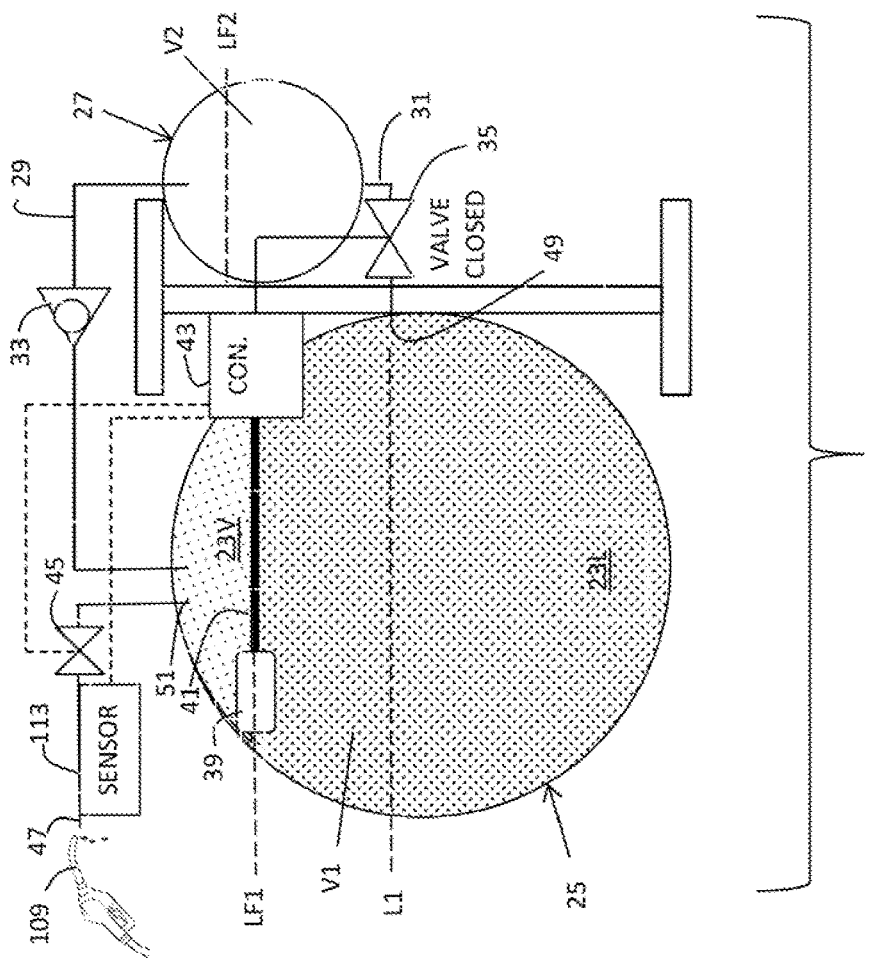

As seen in FIG. 1, the fuel tank system 21 includes a first tank 25 having a first volume V1 and a second tank 27 having a second volume V2. A first conduit 29 extends between a top of the first tank 25 and a top of the second tank 27. For purposes of the present discussion, the "tops" and of the first tank 25 and the second tank 27 can be considered to be any points on the tanks that are above the level LF1 and LF2 to which the tanks are intended to be filled with liquid DME so that the first conduit 29 will ordinarily be solely used for permitting gas flow between the first and second tanks. The tank 25 and 27 may, however, be filled above the levels LF1 and/or LF2, such as when liquid DME expands at elevated temperatures.

A second conduit 31 extends between the first tank 25 and a bottom of the second tank 27. The second conduit 31 may extend between the bottom of the first tank 25 and the bottom of the second tank 27, however, the second conduit is ordinarily intended to permit flow of liquid DME from the second tank to the first tank. To facilitate this flow of liquid DME, it can be desirable to have the second conduit 31 connect to the first tank 25 at some point 49 above, usually substantially above, the bottom of the first tank.

A sum of the first volume V1 and the second volume V2 is designed to equal a sum of a first mass volume of the first mass of liquid DME plus an expansion volume ordinarily equal to some percentage (for example, 5%) greater than the first mass volume when volume is filled to LF1. For DME, the expansion volume will typically be at least 15% of the first mass volume when volume is filled to LF1 and, for propane, at least 20%. In a particularly preferred embodiment, the expansion volume will equal 5-25% of the first mass volume and, more preferably, 15-20% of the first mass volume. The expansion volume should, of course, at least equal any percentage of the first mass volume that is required by any relevant statute or regulation.

The fuel tank system 21 can include a one-way pressure relief valve 33 in the first conduit 29. The pressure relief valve 33 ordinarily only permits gas and/or liquid flow from the first tank 25 to the second tank 27 through the first conduit 29 when pressure in the first tank exceeds a first pressure. The first pressure is typically a pressure selected so to provide a substantial safety factor between the first pressure and the bursting pressure of the first tank 25 and is, in any event, at least any safety factor that is required by any relevant statute or regulation. The first and second tanks 25 and 27 will ordinarily also be provided with separate conventional pressure relief valves (not shown) that will permit dumping of fuel or vapor outside of the fuel tank system in the event of over-pressure.

Figure 2:
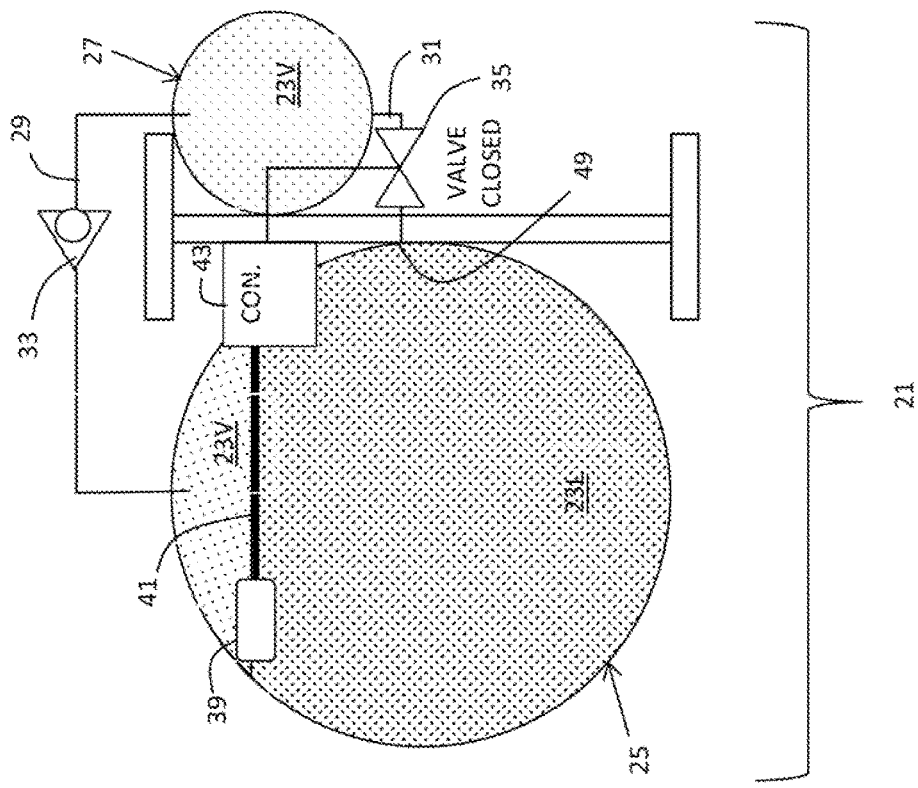

FIG. 1 shows the first tank 25 filled with DME liquid 23L and vapor 23V at a pressure below the pressure necessary to open the pressure relief valve 33 to the second tank 27. FIG. 2 shows the first tank 25 filled with DME liquid 23L and vapor 23V at a pressure sufficient to open the pressure relief valve 33 so that DME vapor enters the second tank 27. FIG. 3 shows the first tank 25 filled with DME liquid 23L that has expanded so as to flow through the pressure relief valve 33 and the first conduit 29 to the second tank 27, and where the entire volume of DME vapor has flowed to the second tank 27. FIG. 4 shows the first tank 25 after DME liquid 23L has been drawn off, such as by being consumed in an engine, and DME liquid 23L and vapor 23V are present in both the first and second tanks 25 and 27.

The first tank 25 is typically provided with a shut-off valve 4 in a fill line 47 to the first tank to prevent filling of the tank above the level LF1. The second tank 27 can also be provided with a shut-off valve (not shown) to prevent filling above the level LF2. In a presently preferred embodiment, no shut-off valve is required for the second tank 27 because preventing filling of the first tank 25 above the level LF1 will also prevent filling of the second tank above the level LF2 due to the presence of various structures such as one-way valves that can be provided so that fluid flow will ordinarily not be permitted from the first tank to the second tank. Additionally, the bottom of the second tank 27 can be vertically above the port 49 where the second conduit 31 connects to the first tank 25, and a valve 35 can be provided in the second conduit and can be closed when the liquid level in the first tank is above the port or above the bottom of the second tank to prevent liquid flow from the first tank to the second tank through the second conduit.

Means for opening and closing the valve 35 can be provided when a liquid level in the first tank 25 is below and above, respectively, a point or level L1 in the first tank of the port 49 where the second conduit opens into the first tank (or the bottom of the second tank 27). The valve 35 will ordinarily be a normally closed valve to avoid unintentionally permitting fluid flow from the first tank 25 to the second tank 27 otherwise than through the first conduit 29. The point or level L1 can be fairly high on the first tank 25, such as at about 80%-90% of the "full" level LF1, so that liquid in the second tank 27 will promptly drain from the second tank to the first tank 25. The point or level L1 will ordinarily be vertically even with or below the bottom of the second tank 27 to permit the second tank to drain into the first tank by gravity and by the force of vapor pressure in the second tank if its vapor pressure is higher than the first tank. A pump (not shown) may be provided to transfer the DME liquid from the second tank 27 to the first tank 25 if, for some reason, it was desired to mount the first tank higher than the second tank.

The opening and closing means can comprise a conventional structure such as a float 39 in the first tank 25 that is linked directly to the valve 35, such as by an arm or lever 41, to open the valve when the float is below the point or level L1 and close it when the float is above L1. The valve 35 will ordinarily be, but is not necessarily, an electric valve and the opening and closing means may further comprise a controller 43 that is linked mechanically, electrically, or by other suitable means, such as by radio or other detectable signals or forces, to the float 39 and that is arranged to send a signal to open the valve 35 in the second conduit 31 when the controller determines, by virtue of the position of the float, that the liquid level is below the point or level L1, and to close the valve 35 when the controller determines that the liquid level is above L1.

Means is also typically provided for opening and closing a fill valve 45 in a fill line 47 to the first tank 25 when the first tank is filled to the "filled" level LF1, and typically comprises the same opening and closing means for opening and closing the valve 35 in the second conduit 31 when the liquid level in the first tank is below and above, respectively, the point or level L1, such as a float 39 or a float in combination with the controller 43. When the first tank 25 is filled to the level LF1, the opening and closing means closes the fill valve 45 so that no additional fuel can be dispensed into the first tank 25 and, when the first tank is filled to a level below the level LF1, the opening and closing means opens the fill valve 45 to permit additional fuel to be dispensed into the first tank. Typically, but not necessarily, the level LF1 is set so that the fill valve 45 will close when there is a predetermined percentage, e.g., 5%, of the volume V1 of the first tank 25 that is unfilled. The fill line may, however, lead to both the first and the second tanks, and separate opening and closing means may be provided for both the first and second tanks, and may shut off the fill line to the first and second tanks at the same or at different times for each tank depending upon where the levels LF1 and LF2 are set for each tank.

In a presently preferred embodiment, the first tank 25 ordinarily functions as the "main" fuel tank while the second tank's 27 function is typically as an expansion volume to accommodate increased pressure and volume as temperature of the fuel in the fuel tank system 21 rises. In such an embodiment, the first mass volume can be at least as large as the first volume V1 of the first tank 25 or less than the first volume of the first tank, and the first mass volume is typically greater than the second volume V2 of the second tank 27.

Figure 5:
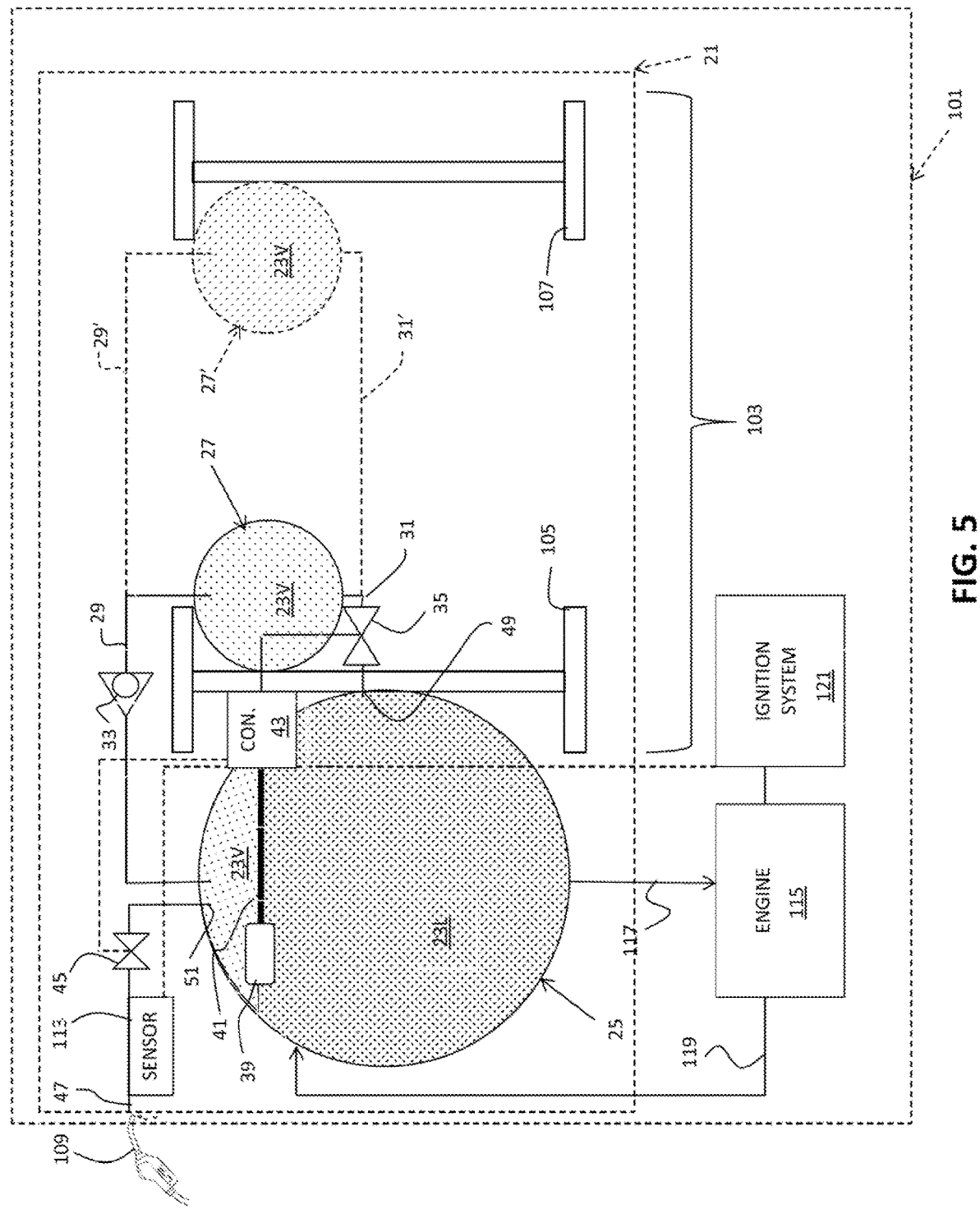
FIG. 5 is a schematic view of a vehicle including a pressurized liquid fuel tank system according to an aspect of the present invention.

A vehicle 101 comprising a DME fuel tank system 21 is shown in FIG. 5. In addition to the fuel tank system 21, the vehicle includes a vehicle frame 103. The DME fuel tank system 21 is mounted on the frame. The frame 103 comprises at least one rail 105, and the first tank 25 and the second tank 27 are mounted on the frame on opposite sides of the at least one rail. The frame 103 ordinarily comprises at least two rails 105 and 107. The first tank 25 and the second tank 27' (shown in phantom) can be mounted to different ones of the at least two rails. It is also possible to have both a second tank 27 mounted on the same rail as the first tank 25 and one or more additional tanks 27' mounted on another rail. It will be appreciated that the multi-tank fuel tank system 21 facilitates advantageous packaging arrangements for the fuel tanks that might not be available in a fuel tank system arranged to carry the same mass of fuel but that uses only a single, larger tank that provides for both the fuel volume and the expansion volume. Another embodiment (not shown) involves sharing of a single expansion tank with two main tanks for packaging convenience. The single expansion tank would have sufficient expansion volume for two main tanks. Use of a single expansion tank could facilitate preventing fuel being returned to either main tank from exceeding the full level, and could facilitate maintaining equal fuel levels in both main tanks.

In a presently preferred embodiment, the first tank 25 includes a port 51 that connects the first tank to a fill line 47 for introducing a fueling nozzle 109 into the first tank or into the fill line. Means for opening and closing the valve 35 in the second conduit 31 when the fueling nozzle 109 is removed from and introduced into the first tank 25 or the fill line 47 can be provided to ensure that only the first tank is able to be filled with liquid fuel. The opening and closing means can include structures such as a device 113 in the first tank 25 or the fill line 47 to detect the presence or absence of a fueling nozzle and send a signal to a controller 43 for closing or opening, respectively, the valve 35. For example, the device 113 might comprise a sensor that senses or a switch that closes when a fueling nozzle 109 is introduced into the first tank 25 or into the fill line 47 and physically contacting the sensor or switch and permits a signal to be sent to the controller 43 that causes the controller to close the valve 35, and that senses or opens when the fueling nozzle is removed to stop the sending of the signal to the controller and that causes the controller to open the valve. The valve 35 can be controlled by the arm of the float 39. When the first mass volume is at or above line L1, the valve 35 will be closed and, when the first mass volume is below L1, the valve 35 will be open. The control of the valve 35 based on the position of the float 39 can be performed by a mechanical control or via the controller 43. It will be appreciated that the level in the tank 25 can be measured by means other than a float, such as electronic sensors involving ultrasound, radar, or optical sensing.

In a presently preferred embodiment, the vehicle 101 includes an engine 115 fueled by DME in the fuel tank system 21. A feed line 117 extends from, typically, the first tank 25 to the engine 115 where, typically, some fuel is injected into cylinders (not shown) in the engine and some fuel is circulated through components of the engine to cool engine components and is then returned to the first tank through a return line 119. The engine 115 is adapted to be turned on and off by conventional means, such as by a key operated electronic control system 121. Means can be provided to automatically close the valve 35 in the second conduit 31 when the engine 115 is turned off to avoid unsafe filling of the fuel tank system, and to permit the valve 35 to open when the engine is turned on. The opening and closing means can comprise a controller 43 that receives a first signal from a key switch of the control system 121, such as an engine electronic controller unit (EECU) that indicates that the key has been turned to an "ON" position, and that sends a signal to the valve 35 to permit the valve to open, and that receives a different signal (e.g., no signal) when the key has been turned to an "OFF" position, and that sends a signal to the valve to close the valve. The opening and closing means can be arranged, after closing the valve 35 when the engine 115 is turned "OFF" to keep the valve 35 closed when the engine is turned back "ON", at least until some other signal is provided to permit the valve to open, such as a signal that the level of fuel in the first tank 25 has fallen below the level L1.

As seen in FIG. 5, the second tank 27 can comprise a plurality of second tanks to further facilitate optimizing the packaging of the fuel tank system 21 on the vehicle. It multiple second tanks 27 and 27' (shown in phantom) and are provided, the first conduit may comprise a plurality of discrete first conduits between the top of the first tank 25 and the tops of each of the plurality of second tanks. Alternatively, as seen in FIG. 5, one first conduit 29 can be provided between the top of the first tank 25 and the top of one 27 of the plurality of second tanks, and a further conduit 29' (shown in phantom) can be provided between the top of the one of the plurality of second tanks and another one 27' of the plurality of second tanks. Similarly, at least one second conduit 31 can be provided between the first tank 25 and the bottom of at least one of a plurality of second tanks 27, i.e., the second conduit may comprise a plurality of discrete second conduits between the first tank and the bottoms of each of the second tanks or, as seen in FIG. 5, one second conduit 31 between the first tank and the bottom of one 27 of the plurality of second tanks and a further conduit 31' (shown in phantom) connecting the bottoms of the one second tank and other second tanks 27'.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A pressurized liquid fuel tank system for fuels stored under pressure, the fuel tank system being arranged to contain a first mass of liquid fuel, comprising:
   a first pressure vessel configured for containing liquid fuel and having a first volume;
   one or more second pressure vessels configured for containing liquid fuel, one of the one or more second pressure vessels having a second volume;
   a first conduit attached to a top of the first pressure vessel and a top of each of the one or more second pressure vessels; and
   a second conduit separate from the first conduit and attached to the first pressure vessel and a bottom of each of the one or more second pressure vessels;
   wherein a sum of the first volume and the second volume is designed to equal a sum of a first mass volume of the first mass of liquid fuel plus a vapor head space expansion volume equal to at least 5% of the first mass volume, wherein an open end of the first conduit is disposed at the top of the first pressure vessel, and wherein the first conduit is connected only to the first pressure vessel, one or more valves, and the one or more second pressure vessels.

2. The pressurized liquid fuel tank system as set forth in claim 1, comprising a one-way pressure relief valve in the first conduit, the pressure relief valve only permitting flow from the first pressure vessel to the one or more second pressure vessels through the first conduit when pressure in the first pressure vessel exceeds a first pressure.

3. The pressurized liquid fuel tank system as set forth in claim 1, comprising a valve in the second conduit and means for opening the valve when a liquid level in the first pressure vessel is below a point where the second conduit opens into the first pressure vessel.

4. The pressurized liquid fuel tank system as set forth in claim 3, wherein the opening means comprises at least one of a float and an electronic sensor in the first pressure vessel.

5. The pressurized liquid fuel tank system as set forth in claim 4, wherein the opening means comprises a controller linked to the float and arranged to send a signal to the valve when the liquid level is below the point where the second conduit opens into the first pressure vessel.

6. The pressurized liquid fuel tank system as set forth in claim 3, wherein the valve is a normally closed valve.

7. The pressurized liquid fuel tank system as set forth in claim 1, wherein the first mass volume is at least as large as the first volume and is greater than the second volume.

8. The pressurized liquid fuel tank system as set forth in claim 1, wherein the first mass volume is less than the first volume and is greater than the second volume.

9. The pressurized liquid fuel tank system as set forth in claim 1, wherein the second conduit extends to both of the first pressure vessel and the bottom of the second pressure one or more vessels.

10. The pressurized liquid fuel tank system as set forth in claim 1, wherein a fuel line is connected to the first pressure vessel at a bottom of the first pressure vessel and is separate from the first conduit.

11. A vehicle comprising a pressurized liquid fuel tank system for fuels stored under pressure, the fuel tank system being arranged to contain a first mass of liquid fuel, comprising:
a vehicle frame; and
the pressurized liquid fuel tank system mounted on the frame, comprising
a first pressure vessel having a first volume,
a second pressure vessel having a second volume,
a first conduit attached to a top of the first pressure vessel and a top of the second pressure vessel, and
a second conduit separate from the first conduit and attached to the first pressure vessel and a bottom of the second pressure vessel,
wherein a sum of the first volume and the second volume is designed to equal a sum of a first mass volume of the first mass of liquid fuel plus a vapor head space expansion volume equal to at least 5% of the first mass volume, and wherein an open end of the first conduit is disposed at the top of the first pressure vessel; and
an engine fueled by Dimethyl-Ether in the fuel tank system, the engine being adapted to be turned on and off, a valve in the second conduit, and means for closing the valve when the engine is turned off.

12. The vehicle as set forth in claim 11, wherein the frame comprises at least one rail, and the first pressure vessel and the second pressure vessel are mounted on the frame on opposite sides of the at least one rail.

13. The vehicle as set forth in claim 12, wherein the frame comprises at least two rails, and the first pressure vessel and the second pressure vessel are mounted to different ones of the at least two rails.

14. The vehicle as set forth in claim 11, wherein the frame comprises at least two rails, and the first pressure vessel and the second pressure vessel are mounted to different ones of the at least two rails.

15. The vehicle as set forth in claim 11, comprising a one-way pressure relief valve in the first conduit, the pressure relief valve only permitting flow from the first pressure vessel to the second pressure vessel through the first conduit when pressure in the first pressure vessel exceeds a first pressure.

16. The vehicle as set forth in claim 11, comprising a valve in the second conduit and means for opening the valve when a liquid level in the first pressure vessel is below a point where the second conduit opens into the first pressure vessel.

17. The vehicle as set forth in claim 16, wherein the valve is a normally closed valve.

18. The vehicle as set forth in claim 11, comprising a port for introducing a fueling nozzle into the first pressure vessel or a fill line for the first pressure vessel, a valve in the second conduit, and means for closing the valve when the fueling nozzle is introduced into the first pressure vessel or the fill line.

19. The vehicle as set forth in claim 11, wherein the second pressure vessel comprises a plurality of pressure vessels.

20. The vehicle as set forth in claim 19, wherein the first conduit connects the top of the first pressure vessel and the tops of each of the plurality of pressure vessels.

21. The vehicle as set forth in claim 19, comprising at least one first conduit between the top of the first pressure vessel and the top of at least one of the plurality of pressure vessels.

22. The vehicle as set forth in claim 19, comprising at least one second conduit between the first pressure vessel and the bottom of at least one of the plurality of pressure vessels.

23. The vehicle as set forth in claim 19, wherein the second conduit extends to both of the first pressure vessel and the bottom of the plurality of pressure vessels.

24. The vehicle asset forth in claim 11, wherein the first conduit is connected only to the first pressure vessel, one or more valves, and the one or more second pressure vessels.

25. The vehicle as set forth in claim 11, wherein a fuel line is connected to the first pressure vessel at a bottom of the first pressure vessel and is separate from the first conduit.

26. A vehicle comprising a pressurized liquid fuel tank system for fuels stored under pressure, the fuel tank system being arranged to contain a first mass of liquid fuel, comprising:
a vehicle frame;
the pressurized liquid fuel tank system mounted on the frame, comprising
a first pressure vessel having a first volume,
a second pressure vessel having a second volume,
a first conduit attached to a top of the first pressure vessel and a top of the second pressure vessel,
a second conduit separate from the first conduit and attached to the first pressure vessel and a bottom of the second pressure vessel, and
an engine fueled by Dimethyl-Ether in the fuel tank system, the engine being adapted to be turned on and off, a valve in the second conduit, and means for closing the valve when the engine is turned off,
wherein a sum of the first volume and the second volume is designed to equal a sum of a first mass volume of the first mass of liquid fuel plus a vapor head space expansion volume equal to at least 5% of the first mass volume, wherein the closing means is arranged, after closing the valve when the engine is turned off, to keep the valve closed when the engine is turned back on.

* * * * *